United States Patent
Minemura

(10) Patent No.: US 10,723,347 B2
(45) Date of Patent: Jul. 28, 2020

(54) VEHICLE CONTROL DEVICE AND VEHICLE CONTROL METHOD

(71) Applicant: DENSO CORPORATION, Kariya, Aichi-pref. (JP)

(72) Inventor: Akitoshi Minemura, Kariya (JP)

(73) Assignee: DENSO CORPORATION, Kariya, Aichi-Pref. (JP)

(*) Notice: Subject to any disclaimer, the term of this patent is extended or adjusted under 35 U.S.C. 154(b) by 282 days.

(21) Appl. No.: 15/578,646

(22) PCT Filed: Apr. 15, 2016

(86) PCT No.: PCT/JP2016/062096
§ 371 (c)(1),
(2) Date: Nov. 30, 2017

(87) PCT Pub. No.: WO2016/194491
PCT Pub. Date: Dec. 8, 2016

(65) Prior Publication Data
US 2018/0162389 A1 Jun. 14, 2018

(30) Foreign Application Priority Data

Jun. 2, 2015 (JP) .................................. 2015-112075

(51) Int. Cl.
*G01S 13/931* (2020.01)
*G01S 13/86* (2006.01)
(Continued)

(52) U.S. Cl.
CPC ............... *B60W 30/09* (2013.01); *B60T 7/12* (2013.01); *B60T 7/22* (2013.01); *B60T 8/17* (2013.01);
(Continued)

(58) Field of Classification Search
CPC ............ B60W 30/09; B60W 2420/42; B60W 2420/52; B60W 2510/18; B60W 2520/10;
(Continued)

(56) References Cited

U.S. PATENT DOCUMENTS 7,725,228 B2 * 5/2010 Kobayashi ............ B60T 8/3275
701/45
7,825,849 B2 * 11/2010 Tsuchida ............... G01S 13/931
342/52
(Continued)

FOREIGN PATENT DOCUMENTS

JP 2003-015743 A 1/2003
JP 2006-306166 A 11/2006
(Continued)

*Primary Examiner* — Robert T Nguyen
(74) *Attorney, Agent, or Firm* — Maschoff Brennan

(57) ABSTRACT

An ECU drives a brake device of a vehicle to reduce a collision risk with an object or collision damage of the vehicle. The ECU acquires position information of the object based on a combination of data transmitted from a radar device and an in-vehicle camera. The ECU performs a first judgment to detect whether to drive the brake device based on the acquired position information of the object. The ECU further performs a second judgment to detect whether to drive the brake device based on another calculation process. The ECU diagnoses the result of the first judgment. When the result of the first judgment is correct, an operation limitation part in the ECU transmits the result of the first judgment to the control processing part to drive the brake device, and when incorrect, prohibits the transmission of the result of the first judgment to the control processing part.

10 Claims, 6 Drawing Sheets

(51) Int. Cl.
*G08G 1/16* (2006.01)
*G07C 5/08* (2006.01)
*B60W 30/09* (2012.01)
*G08G 1/097* (2006.01)
*B60T 8/17* (2006.01)
*B60T 7/22* (2006.01)
*B60T 7/12* (2006.01)
*B60R 21/0134* (2006.01)

(52) U.S. Cl.
CPC .......... *G01S 13/867* (2013.01); *G01S 13/931* (2013.01); *G07C 5/08* (2013.01); *G08G 1/097* (2013.01); *G08G 1/16* (2013.01); *G08G 1/166* (2013.01); *B60R 21/0134* (2013.01); *B60T 2201/022* (2013.01); *B60W 2420/42* (2013.01); *B60W 2420/52* (2013.01); *B60W 2510/18* (2013.01); *B60W 2520/10* (2013.01); *B60W 2520/14* (2013.01); *B60W 2540/18* (2013.01); *B60W 2554/00* (2020.02); *G01S 2013/93185* (2020.01); *G01S 2013/93271* (2020.01)

(58) Field of Classification Search
CPC ......... B60W 2520/14; B60W 2540/18; B60W 2550/10; G01S 13/867; G01S 13/931; G01S 2013/9346; G01S 2013/9375; G07C 5/08; G08G 1/097; G08G 1/16; G08G 1/166; B60R 21/0134; B60T 7/12; B60T 7/22; B60T 8/17; B60T 2201/022
See application file for complete search history.

(56) References Cited

U.S. PATENT DOCUMENTS

| | | | |
|---|---|---|---|
| 9,669,838 B2 * | 6/2017 | Komar | .................. B60W 40/04 |
| 10,444,345 B2 * | 10/2019 | Hara | ..................... G01S 13/931 |
| 2006/0091653 A1 * | 5/2006 | De Mersseman | ..... G01S 13/931 |
| | | | 280/735 |
| 2009/0135065 A1 | 5/2009 | Tsuchida et al. | |

FOREIGN PATENT DOCUMENTS

| | | |
|---|---|---|
| JP | 2007-226680 A | 9/2007 |
| JP | 2009-271766 A | 11/2009 |
| JP | 4528457 B2 | 8/2010 |

* cited by examiner (a) JUDGMENT RESULT OF MAIN JUDGMENT PROCESS (b) JUDGMENT RESULT OF DIAGNOSIS JUDGMENT PROCESS (c) JUDGMENT RESULT TO BE TRANSMITTED TO FOLLOWING STAGE (a) JUDGMENT RESULT OF MAIN JUDGMENT PROCESS (b) JUDGMENT RESULT OF DISGNOSIS JUDGMENT PROCESS (c) JUDGMENT RESULT TO BE TRANSMITTED TO FOLLOWING STAGE

VEHICLE CONTROL DEVICE AND VEHICLE CONTROL METHOD

TECHNICAL FIELD

The present invention relates to vehicle control devices capable of driving a safety device mounted on an own vehicle during a high collision risk to an object which is present in front of the own vehicle in a forward direction, and relates to vehicle control methods to be executed by the vehicle control device.

BACKGROUND ART

Recently, there has been proposed a technique regarding a pre-crash safety (PCS) system. The PCS system is driven when collision risk of an own vehicle increases to a high level in order to prevent a collision of the own vehicle with another vehicle, a pedestrian or a structure on a roadway, etc. When an incorrect calculation, used for driving the safety device, occurs due to a memory error, etc., the incorrect calculation often causes incorrect driving of the safety device.

In order to solve this problem, Patent document 1 has provided an automobile brake device. This automobile brake device has a control unit of a hierarchy structure having plural units, in which each unit calculates a braking force instruction value based on another braking force instruction value transmitted from a high hierarchy-level unit and sensor information transmitted from various sensors, and sequentially transmits the calculated braking force instruction value to a low hierarchy-level unit.

In the automobile brake device, the high hierarchy-level unit diagnoses the calculation results of the low hierarchy-level which is at one level lower. When a diagnosis result indicates that an incorrect calculation has occurred in the low hierarchy-level, the high hierarchy-level unit transmits to another lower unit at two levels lower. This control makes it possible to suppress the low hierarchy-level, in which an incorrect calculation occurs, from operating, and to drive the automobile brake device only by using the units which operate correctly.

CITATION LIST

Patent Literature

[Patent document 1] Japanese patent publication No. JP 4528457.

SUMMARY OF INVENTION

Technical Problem

The automobile brake device previously described does not diagnose the calculation result of the highest unit for calculating a brake force instruction value on the basis of a deceleration request transmitted from a pedal unit of the own vehicle. Accordingly, when the automobile brake device is applied to the PCS system and the highest unit has failed, i.e. suffers an abnormal, there would be caused a possible incorrect operation of the safety device.

The present invention has been made in consideration of the foregoing circumstances, and it is an object of the present invention to provide a vehicle control device capable of properly and correctly suppressing incorrect operation of a safety device mounted on a vehicle.

Solution to Problem

In accordance with one aspect of the present invention, there is provided a vehicle control device to be mounted on an own vehicle. The own vehicle is equipped with a radar device and an in-vehicle camera device. The vehicle control device drives a safety device so as to reduce a collision risk with an object or collision damage of the own vehicle when the level of the collision risk of the own vehicle with the object increases and reaches a predetermined level. The object is present in front of the own vehicle. The vehicle control device has a computer system including a central processing unit configured to provide an object position acquiring part, an operation judgment part, an operation diagnosis part, a control processing part and an operation limitation part. The object position acquiring part acquires a position of the object on the basis of a combination of position information of the object detected by the radar device and position information of the object detected by the in-vehicle camera device. The operation judgment part judges whether to drive the safety device on the basis of the position of the object acquired by the object position acquiring part. The operation diagnosis part diagnoses a judgment result of the operation judgment part determining whether to drive the safety device by using a calculation process which is different from the process performed by the operation judgment part on the basis of the position of the object acquired by the object position acquiring part. The control processing part drives the safety device. The operation limitation part transmits a judgment result of the operation judgment part to the control processing part when the operation diagnosis part has diagnosed that the judgment result of the operation judgment part is correct. Further, the operation limitation part prohibits the transmission of the judgment result of the operation judgment part when the operation diagnosis part has diagnosed that the judgment result of the operation judgment part is incorrect.

According to the present invention, the position of the object is acquired on the basis of the combination of the position information of the object detected by the radar device and the position information of the object detected by the in-vehicle camera device. Further, the judgment process as a main judgment process judges whether to drive the safety device on the basis of the acquired position of the object.

Still further, the diagnosis judgment process as another judgment process, which is different from the main judgment process and performs another calculation, and judges whether to drive the safety device. The diagnosis judgment process further diagnoses whether the judgment result of the main judgment process is correct. When a memory error occurs during the main judgment process and the judgment result of the main judgment process becomes incorrect due to the memory error, it is possible to correctly diagnose that the judgment result of the main judgment process is incorrect, i.e. an abnormal, because the judgment result of the main judgment process is different from the judgment result of the diagnosis judgment process.

When the diagnosis judgment process diagnoses that the judgment result of the main judgment process is correct, the judgment result of the main judgment process is transmitted to the control processing part, and the control processing part drives the safety device. On the other hand, when the diagnosis judgment process diagnoses that the judgment result of the main judgment process is incorrect, it is prohibited from transmitting the judgment result of the main judgment process to the control processing part. Accordingly, when the judgment result of the main judgment process is incorrect, no safety device is driven. This control suppresses incorrect operation of the safety device with high efficiency.

DESCRIPTION OF EMBODIMENTS

Next, a description will be given of the vehicle control device according to various exemplary embodiments with reference to the drawings. The vehicle control device according to each of the exemplary embodiments is mounted on an own vehicle, detects various objects, which are present in a forward direction around the own vehicle. The vehicle control device works as a PCS system so as to reduce a collision risk with an object or collision damage of the own vehicle. In the explanation of each of the exemplary embodiments, the same components and functions will be designated by using the same reference number and characters. The duplicate explanation for the same components and functions are omitted for brevity.

First Exemplary Embodiment

Figure 1:
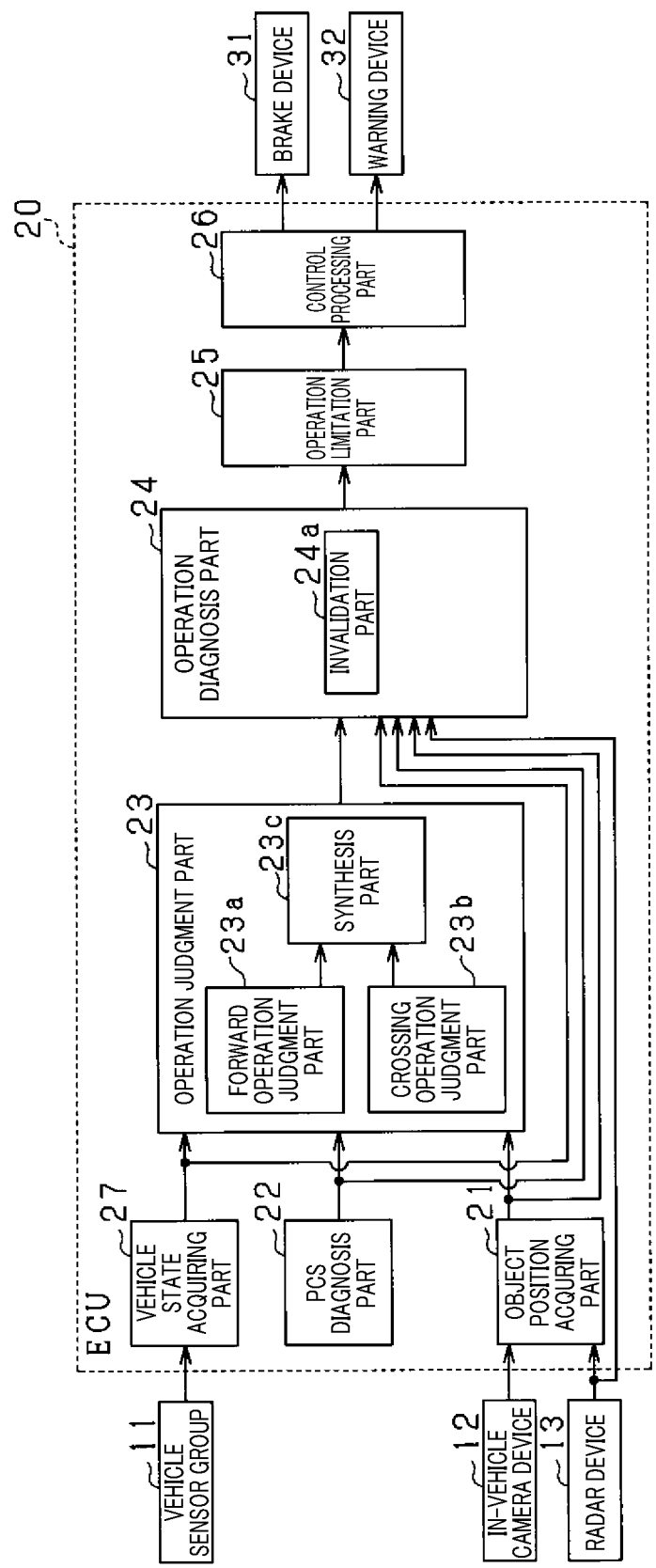
FIG. 1 is a view showing a block diagram of a schematic structure of a vehicle control device according to a first exemplary embodiment.

A description will be given of the structure of the vehicle control device according to the first exemplary embodiment with reference to FIG. 1.

The vehicle control device according to the exemplary embodiments consists of an electronic control unit (ECU) 20. The electronic control unit, i.e. ECU 20 is a computer system having a CPU, a ROM, a RAM, I/O, etc. The CPU in the ECU 20 executes programs stored in the ROM to provide each of various functions. Those functions will be explained later.

The ECU 20 is connected to a vehicle sensor group 11, an in-vehicle camera device 12, and a radar device 13 so as to receive various detection information. Further, the ECU 20 is connected to a brake device 31 and a warning device 32 as a safety device so as to provide control instructions to the safety device.

In order to detect various states of the own vehicle, the vehicle sensor group 11 contains a speed sensor, a yaw rate sensor, a steering angle sensor, etc. The speed sensor detects a moving speed of the own vehicle. The yaw rate sensor detects a raw rate of the own vehicle. The steering angle sensor detects a steering angle.

For example, the radar device 13 is a millimeter radar device which transmits, as transmission waves, millimeter waves. The radar device 13 is arranged at a front part of the own vehicle. The radar device 13 detects one or more objects within a detection range and calculates a position of each object. The radar device 13 has plural antennas. Specifically, the radar device 13 transmits transmission waves at predetermined period, and receives reflected waves, which have been reflected by the object around the own vehicle, through the plural antennas. The radar device 13 calculates a distance between the own vehicle and the object on the basis of a period of time counted from the timing when the radar device 13 transmits the transmission waves to a timing when the radar device 13 receives the reflected waves.

The radar device 13 calculates a relative speed of the object to the own vehicle on the basis of frequency variation of the reflected waves caused by the Doppler effect. The radar device 13 calculates an azimuth of the object on the basis of phase difference between the reflected waves received by the plural antennas. Thus, it is possible for the radar device 13 to specify the relative position of the object to the own vehicle on the basis of the calculated position and azimuth of the object. The radar device 13 transmits the transmission waves, receives the reflected waves, and calculates the relative position and relative speed of the object to the own vehicle every predetermined period of time, and transmits the calculated relative position and relative speed of the object to the own vehicle to the ECU 20.

For example, the in-vehicle camera device 12 is a monocular camera or a stereo camera composed of a CCD image sensor, a CMOS image sensor, a near-infrared sensor, etc. The in-vehicle camera device 12 is arranged at the upper part of a windshield glass and the central part in the wide direction of the own vehicle. The in-vehicle camera device 12 captures front view images within a predetermined angle range in a forward moving direction of the own vehicle. The in-vehicle camera device 12 detects a position of each object contained in the front view images within the predetermined angle range.

The in-vehicle camera device 12 extracts feature points from the captured front view image. The feature points represent an object to be detected. Specifically, the in-vehicle camera device 12 extracts edge points from the front view image on the basis of brightness information of the front view image, and performs the Hough transform of the extracted edge points to generate the feature points of the object. The in-vehicle camera device 12 capture front view images and extracts those feature points of the object to be detected at the predetermined period of time. The in-vehicle camera device 12 transmits information of the feature points of the object as the position information of the object to be detected to the ECU 20. It is acceptable to use a predetermined period of time which is the same as, or different from the predetermined period of time used by the in-vehicle camera device 12

The brake device 31 brakes the motion of the own vehicle. When the ECU 20 determines to drive the brake device 31 due to the increasing of the collision risk of the own vehicle with the object, the brake device 31 receives a control instruction transmitted from the ECU 20. When receiving the control instruction, the brake device 31 bakes the own vehicle. Specifically, the brake device 31 assists the driver of the own vehicle to increase the brake force (brake assist function), and performs the automatic braking function regardless of the driver's brake operation of the brake pedal of the own vehicle.

The warning device 32 corresponds to speakers and a display device mounted to the compartment of the own vehicle. When the collision risk with an obstacle increases, the ECU 20 determines to drive the warning device. When receiving control instruction signals transmitted from the ECU 20, the warning device 32 generates warning sounds and messages on the basis of the received control instruction signals, and provides the warning sounds and messages as hazard warning to the driver of the own vehicle. The pre-crash safety system, i.e. PCS system has the various functions such as the automatic braking function, the brake assist function, and warning function.

The automatic braking function is selected when the collision risk is higher than in the case of executing the brake assist function and the case of providing the warning sounds and messages. In the first exemplary embodiment, the brake assist and the warning sounds and messages correspond to a first operation, and the automatic braking function corresponds to a second operation.

The ECU 20 provides the various functions such as an object position acquiring part 21, a PCS diagnosis part 22, a vehicle state acquiring part 27, an operation judgment part 23, an operation diagnosis part 24, an operation limitation part 25 and a control processing part 26.

The object position acquiring part 21 combines position information (first detection information) of the object detected by the radar device 13 with position information (second detection information) of the object detected by the in-vehicle camera device 12, and obtains the position information of the object. Specifically, the object position acquiring part 21 receives the first detection information transmitted from the radar device 13 and obtains the position (as the first position) of the object. Further, the object position acquiring part 21 receives the second detection information transmitted from the in-vehicle camera device 12 and obtains the position (as the second position) of the object. The object position acquiring part 21 generates a correspondence relationship between the first position and the second position which are close to each other. The correspondence relationship represents that the first position and the second position correspond to the same object to be detected. When the second position closes to the first position, there is a high possibility in which the first position and the second position represent the same object.

It will be referred to as a "fusion state (FSN state)" when the position information of the object has been obtained with high accuracy, as previously described.

The object position acquiring part 21 refers a detection history of the object when this object is in the FSN state, and detects whether the FSN state of the object is continued.

When the detection result indicates that the FSN state of the object is continued, the object position acquiring part 21 determines that the object is present at the detected position. When the FSN state of the object is discontinued after its continuation FSN state of the object, the object position acquiring part 21 refers the detection history and determines that the object has been present at the previous position during a predetermined period of time. That is, the determination of the position of the object in the FSN state corresponds to a FSN calculation process. Because the radar device 13 has a detection accuracy which is higher than that of the in-vehicle camera device 12, the ECU 20 as the vehicle control device according to the first exemplary embodiment determines the FSN state on the basis of the first position detected by the radar device 13.

The object position acquiring part 21 performs a pattern matching process of the second detection information of the object which is in the FSN state. This pattern matching process uses predetermined patterns.

The object position acquiring part 21 determines a type of the object, i.e. detects whether the object is a vehicle or a pedestrian, and generates a correspondence relationship between the object and its type. It is acceptable for the pedestrian as one type of the object to include a person on a bicycle. Further, the object position acquiring part 21 generates a correspondence relationship between the object and the relative position of the object to the own vehicle and the relative speed of the object to the own vehicle.

The PCS diagnosis part 22 judges whether the state of the PCS system allows the PCS system to operate. For example, when an axial misalignment occurs in the radar device 13 or the in-vehicle camera device 12, a detection misalignment of the object occurs. This would cause a possible incorrect estimation of a collision risk between the own vehicle and the object. Accordingly, the PCS diagnosis part 22 prohibits the PCS system from being driven when the PCS system is in the incorrect state such as the occurrence of the axial misalignment of the radar device 13 or the in-vehicle camera device 12.

The vehicle state acquiring part 27 acquires a vehicle state such as a speed of the own vehicle, a yaw rate of the own vehicle, a steering angle, etc. on the basis of the detection information transmitted from the vehicle sensor group 11. Further, the vehicle state acquiring part 27 estimates a curvature radius of a drive lane, on which the own vehicle is driving, on the basis of the state of the own vehicle.

The operation judgment part 23 has functions of a forward operation judgment part 23a, a crossing operation judgment part 23b, and a synthesis part 23c. The operation judgment part 23 estimates a collision risk per object and determines whether it is necessary to drive the safety device, i.e. determines whether it is necessary to perform each function of the PCS system on the basis of the position information of the object obtained by the FSN calculation process of the object position acquiring part 21.

Specifically, the operation judgment part 23 determines the operation timing and the operation condition of each of the PCS functions, and calculates an estimated collision time at which the own vehicle would collide with the object on the basis of the relative position and the relative speed of the object to the own vehicle. The operation judgment part 23 determines an ON judgment to turn ON the corresponding function of the PCS system, i.e. to activate the corresponding function of the PCS system when the operation condition of the corresponding function is satisfied.

It is possible to determine the operation timing of each function of the PCS system so that the warning function, the braking assist function, the automatic braking function are performed at consecutive different timings, respectively, in order.

For example, it is possible for the operation judgment part 23 to use the following state conditions as the operation condition:

an estimated value of a curvature of the roadway is within a predetermined range and a speed of the own vehicle is within a predetermined range;

the state of the PCS system is correct;

the position of the object obtained by the FSC calculation process is within the detection range of the radar device 13 and the in-vehicle camera device 12; and an estimated collision timing of the own vehicle to the object is within the operation timing, etc.

When all of the state conditions previously described are satisfied, the operation judgment part 23 determines the satisfaction of the operation condition. However, the concept of the present invention is not limited by this. For example, it is acceptable for the operation judgment part 23 to determine the satisfaction of the operation condition when a part of the state conditions is satisfied.

In particular, when the radar device 13 or the in-vehicle camera device 12 provides incorrect detection result of the object, each function of the PCS system is not driven even if the state condition is satisfied, where the position of the object obtained by the FSN calculation process is within the detection range of the radar device 13 and the in-vehicle camera device 12.

Here, it is defined that a forward area Re which is forward in the forward direction of the own vehicle by the left-right width of the own vehicle. Because an object which is present within the forward area Re is different in moving direction and moving speed in view of the collision risk from an object outside of the forward area Re, it is necessary to use a different calculation method to estimate the collision timing for each of those objects. For example, the collision risk of an object which is present within the forward area Re in front of the own vehicle in the forward direction of the own vehicle becomes higher than the collision risk of the object when the object moves in the reverse direction of the forward direction of the own vehicle, or becomes higher than the collision risk when the object stops within the forward area Re.

On the other hand, the collision risk of an object, which is present outside of the forward area Re in the forward direction of the own vehicle becomes higher than the collision risk of an object which is crossing in a lateral direction, which is perpendicular to the forward direction of the own vehicle, in front of the own vehicle. The crossing of the object in a lateral direction, which is perpendicular to the forward direction of the own vehicle, represents that the object is crossing the roadway in front of the own vehicle from a right hand side to a left hand side of the own vehicle or from the left hand side to the right hand side of the own vehicle. Accordingly, it is preferable for the vehicle control device according to the exemplary embodiment to use a different operation judgment of each function of the PCS system for each of an object within the forward area Re and an object outside from the forward area Re.

The forward operation judgment part 23a selects an object, as a target object which is present within the forward area Re, from objects in the front view image captured by the object position acquiring part 21.

The forward operation judgment part 23a performs the operation judgment of each function of the PCS system on the basis of the position of the target object within the forward area Re, in more detail, on the basis of the relative position and relative speed of the target object to the own vehicle.

Further, the crossing operation judgment part 23b selects an object, which is present outside from the forward area Re, from objects in the front view image captured by the object position acquiring part 21. The crossing operation judgment part 23b performs the operation judgment of each function of the PCS system on the basis of the position of the object outside from the forward area Re, in more detail, on the basis of the relative position and relative speed of the object to the own vehicle.

The synthesis part 23c combines the judgment result of the forward operation judgment part 23a and the judgment result of the crossing operation judgment part 23b and provides a judgment result of each function of the PCS system. Specifically, the synthesis part 23c provides the judgment result when at least one of the judgment result of the forward operation judgment part 23a and the judgment result of the crossing operation judgment part 23b represents the ON judgment to activate the corresponding function of the PCS system.

The operation diagnosis part 24 judges whether each function of the PCS system should be driven for each object, on the basis of the position of each object obtained by the FSN calculation process, by using another calculation which is different from the calculation of the operation judgment part 23. The operation diagnosis part 24 further diagnoses the judgment result of the operation judgment part 23. Specifically, the operation diagnosis part 24 determines that the judgment result of the operation judgment part 23 is correct when the judgment result of the operation judgment part 23 is the same as the diagnosis result of the operation diagnosis part 24 itself. On the other hand, the operation diagnosis part 24 determines that the judgment result of the operation judgment part 23 is incorrect when the judgment result of the operation judgment part 23 is not the same as the diagnosis result of the operation diagnosis part 24 itself.

In this exemplary embodiment, the judgment process by the operation judgment part 23 is also referred to with the "main judgment process or a first judgment", and the judgment process by the operation diagnosis part 24 is also referred to with the "diagnosis judgment process or a second judgment".

In addition, the judgment process by the operation diagnosis part 24 and the process to detect whether the main judgment process is correct or abnormal will be referred to as the "diagnosis process".

As previously described, performing the diagnosis judgment process in addition to performing the main judgment process makes it possible to perform the diagnosis judgment process without influence of the systematic failure generated in the main judgment process when a systematic failure of the main judgment process occurs. As a result, this makes it possible to correctly detect occurrence of an abnormal of the main judgment process. In the exemplary embodiments, the systematic failure previously described indicates a temporary and recoverable failure.

In more detail, the operation diagnosis part 24 determines, i.e. judges whether each function of the PCS system is driven on both the position information of the object obtained by the FSN calculation process of the object position acquiring part 21 and the position information of the object detected by the radar device 13. Because the position information of the object obtained by the radar device 13 is used, without using the FSN calculation process by the object position acquiring part 21, in the diagnosis judgment process, it is possible to suppress generation of an incorrect judgment result of the diagnosis judgment process even if the systematic failure occurs during the FSN calculation process. Accordingly, even if the main judgment process provides an incorrect judgment result due to the systematic failure during the FSN calculation process, it is possible for the operation diagnosis part 24 to correctly determine that the main judgment result is incorrect.

In addition, the operation diagnosis part 24 performs the operation judgment whether each function of the PCS system is used by using the operation conditions which is smaller than the operation conditions used by the operation judgment part 23. The reduction of the number of the operation conditions makes it possible to reduce occurrence of memory error when compared with that of the main judgment process. For example, the operation diagnosis part 24 uses the following operation conditions:

an estimated value of a curvature of the roadway is within a predetermined range and a speed of the own vehicle is within a predetermined range;

the state of the PCS system is correct; and the position of the object obtained from the position information of the radar device 13 is within the detection range of the radar device 13. The diagnosis judgment process uses at least one of the operation conditions previously described, and detects whether the selected operation condition is satisfied.

The execution of the automatic braking function needs a highly functional safety. On the other hand, the execution of the warning function and the execution of the brake assist function need a functional safety which is lower than the functional safety of the automatic braking function. That is, incorrect execution of the warning function and the brake assist function does not cause a safety problem. Accordingly, the diagnosis operation of diagnosing the judgment result of the main judgment process is used for preventing incorrect execution of the automatic braking function due to the systematic failures. In this case, it is not necessary to detect whether the judgment result, which prohibits the execution of the automatic braking function, is correct or incorrect. Accordingly, the operation diagnosis part 24 determines to execute the automatic braking function, i.e. that the automatic braking function is in the ON state when the operation conditions previously described are satisfied, and the operation judgment part 23 provides the ON judgment which represents the ON state of the automatic braking function.

Each of the operation conditions used by the operation diagnosis part 24 is less strict than each of the operation conditions used by the operation judgment part 23. For example, the predetermined range of the speed used by the operation diagnosis part 24 is wider than the predetermined range of the speed used by the operation judgment part 23. In addition, when the ECU 20 has an adequate memory area in the ROM, the RAM, etc., it is possible for the operation diagnosis part 24 to perform the judgment process by using the overall operation conditions of the operation judgment part 23.

In more detail, it is possible for the operation diagnosis part 24 to perform the diagnosis judgment process by using the same calculation process of the operation judgment part 23 with the same operation conditions, so long as the operation diagnosis part 24 uses the position information of the object detected by the radar device 13 without the FSN calculation process, and the operation judgment part 23 provides the ON judgment which represents the ON state of the automatic braking function.

When the operation diagnosis part 24 determines that the judgment result of the operation judgment part 23 is correct, the operation limitation part 25 transmits the judgment result of the operation judgment part 23 to the control processing part 26. The control processing part 26 is a following stage to follow the operation limitation part 25.

On the other hand, when the operation diagnosis part 24 determines that the judgment result of the operation judgment part 23 is incorrect, i.e. an abnormal, the operation limitation part 25 prohibits the transmission of the judgment result of the operation judgment part 23 to the control processing part 26. The prohibition of the transmission of the judgment result of the operation judgment part 23 represents that the operation judgment part 23 transmits the OFF judgment to the control processing part 26.

The control processing part 26 drives the safety device. Specifically, when receiving the ON judgment of each function of the PCS system transmitted from the operation limitation part 25, the control processing part 26 transmits a control instruction to the safety device corresponding to the function of the PCS system during the effective period of the ON judgment.

In addition, when receiving the OFF judgment of each function of the PCS system transmitted from the operation limitation part 25, the control processing part 26 does not transmit any control instruction to the safety device corresponding to the function of the PCS system. This makes it possible to operate the function of the PCS system corresponding to the ON judgment, and to prohibit the operation of the function of the PCS system corresponding to the OFF judgment. Accordingly, the corresponding function of the PCS system does not operate when the operation limitation part 25 does not transmit the judgment result of the operation judgment part 23 to the control processing part 26.

The automatic braking function continuously brakes the own vehicle until the own vehicle has stopped. That is, when determining the ON judgment of the automatic braking function once, the operation judgment part 23 continues this ON judgment of the automatic braking function. When the own vehicle approaches the object, there is a possible case for the radar device 13 and/or the in-vehicle camera device 12 to lose the detection of the target object even if the target object is present in front of the own vehicle. As previously described, when determining the ON judgment of the automatic braking function once, the operation judgment part 23 continues this ON judgment of the automatic braking function.

On the other hand, because the operation diagnosis part 24 performs the operation judgment of the automatic braking function every control period, the operation diagnosis part 24 does not continue the ON judgment of the automatic braking function when the radar device 13 and/or the in-vehicle camera device 12 lose the detection of the target object.

Figure 2:
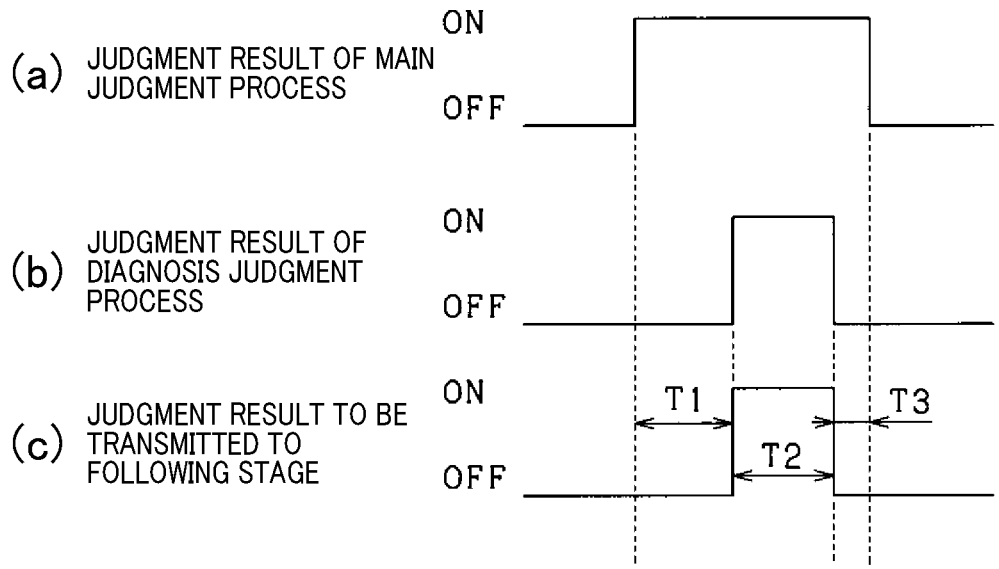
FIG. 2 is a diagram showing logic levels when a diagnosis judgment process has no invalidation period of time, (a) shows a judgment result of a main judgment process, (b) shows a judgment result of the diagnosis judgment process, and (c) shows the judgment result to be transmitted to a following stage.

In FIG. 2, (a) shows the judgment result of the main judgment process, (b) shows the judgment result of the diagnosis judgment process, and (c) shows the judgment result to be transmitted from the operation limitation part 25 to the control processing part 26.

During the period T1, the judgment result of the main judgment process is different from the judgment result of the diagnosis judgment process. This means that the systematic failure occurs in the main judgment process. For this reason, during the period T1, it is determined that the judgment result of the main judgment process is incorrect, i.e. an abnormal, and the OFF judgment is transmitted to the control processing part 26 as the following stage.

During the period T2, the judgment result of the main judgment process is the same as the judgment result of the diagnosis judgment process. This means that the systematic failure has been recovered from and is no longer occurring. The judgment result of the ON judgment as the main judgment process is transmitted to the control processing part 26. The ON judgment of the main judgment process is switched to the OFF judgment after the ON state of the main judgment process has been continued during the period T2 and the period T3. This means that the continuous period of the ON judgment has been finished.

The ON judgment of the main judgment process is continued during the period T3. On the other hand, the judgment result of the diagnosis judgment result indicates the OFF judgment. This means that the target object is lost regardless of the presence of the target object in front of the own vehicle. For this reason, it is determined that the judgment result of the main judgment process is incorrect, and the judgment result of OFF judgment is transmitted to the control processing part 26. That is, during the period T3, the judgment result of the diagnosis judgment process prohibits the use of the judgment result of the main judgment process.

In order to avoid this problem, the operation diagnosis part 24 has an invalidation part 24a. This invalidation part 24a prohibits the use of the judgment result of the diagnosis judgment process during a predetermined period when the operation diagnosis part 24 determines that the judgment result of the operation judgment part 23 is correct. This predetermined period is counted from a timing when the judgment result of the diagnosis judgment process is correct.

This predetermined period, i.e. an invalidation period is an estimated period of time, at least during which the own vehicle stops completely.

The operation limitation part 25 transmits the judgment result of the operation judgment part 23 to the control processing part 26 during the invalidation period in which the judgment result of the diagnosis judgment process is not used. This control makes it possible to prevent the prohibition of using the judgment result of the main judgment process after it has been judged that the judgment result of the main judgment process is correct once. The diagnosis judgment process is used for preventing the incorrect operation of the automatic braking process caused by the incorrect judgment result of the main judgment process. For this reason, it is sufficient to check the timing when the judgment result to be transmitted to the control processing part 26 is switched from the OFF judgment to the ON judgment.

Figure 3:
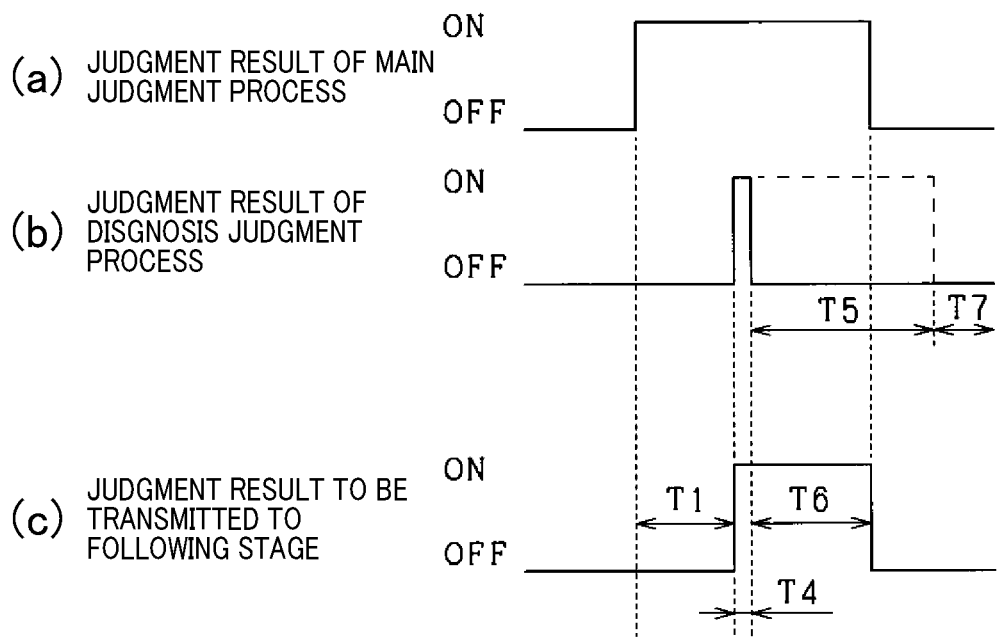
FIG. 3 is a diagram showing logic levels when the diagnosis judgment process has the invalidation period of time, (a) shows a judgment result of the main judgment process, (b) shows a judgment result of the diagnosis judgment process, and (c) shows the judgment result to be transmitted to the following stage.

In FIG. 3, (a) to (c) show the judgment results when the invalidation period is used. That is, (a) to (c) in FIG. 3 correspond to (a) to (c) in FIG. 2, respectively.

The judgment result of the diagnosis judgment process is effective during the period T4 counted from the timing when the judgment result of the main judgment process is correct after the judgment result of the diagnosis judgment process has been switched from the OFF judgment to the ON judgment. For example, it is acceptable to use one control period as the period T4. After the elapse of the period T4, the judgment result of the diagnosis judgment process is invalid during the period T5. That is, the period T5 represents the invalidation period of the diagnosis judgment process. During the period T6 in the period T5, the ON judgment of the main judgment process is continued, and as a result the judgment result of ON judgment of the main judgment process is transmitted to the control processing part 26. During the period T7 after the period T5, the diagnosis judgment process is performed again.

Next, a description will be given of the process of driving the automatic braking function with reference to the flow chart shown in FIG. 4. The ECU 20 repeatedly performs this automatic driving function in the PCS system for every object and predetermined control period. It is acceptable for this control period to be the same as, or different from the predetermined period used by the radar device 13 and the in-vehicle camera device 12.

The ECU 20 receives the first detection information and obtains the first position of the object (S10). The ECU 20 receives the second detection information and obtains the second position of the object (S11).

Next, the ECU 20 receives various types of detection information transmitted from the vehicle sensor group 11, and obtains vehicle state information such as a speed of the own vehicle, a yaw rate of the own vehicle, etc. (S12).

The ECU 20 performs the FSN calculation process by using the first detection information, the first position obtained in step S10, the second detection information and the second position of the object obtained in step S11. Further, the ECU 20 calculates a relative position and a relative speed of the object to the own vehicle (S13).

The ECU 20 detects the state of the PCS system and detects whether the state of the PCS system is an abnormal (S14).

The ECU 20 estimates a collision risk of the own vehicle with the object which is present within the forward area Re in front of the own vehicle on the basis of the results of the processes S12 to S14, and judges whether to activate the automatic braking function (S15).

The ECU 20 estimates a collision risk of the own vehicle with the object which is present outside from the forward area Re in the forward direction of the own vehicle (S16) on the basis of the results of the processes S12 to S14.

The ECU 20 combines the judgment result in S15 and the judgment result in S16 and calculates the judgment result on the basis of the result of the combination (S17).

The ECU 20 determines whether to activate the automatic braking function, i.e. whether the judgment result of the ON judgment is transmitted (S18) on the basis of the judgment result calculated in S17.

Figure 4:
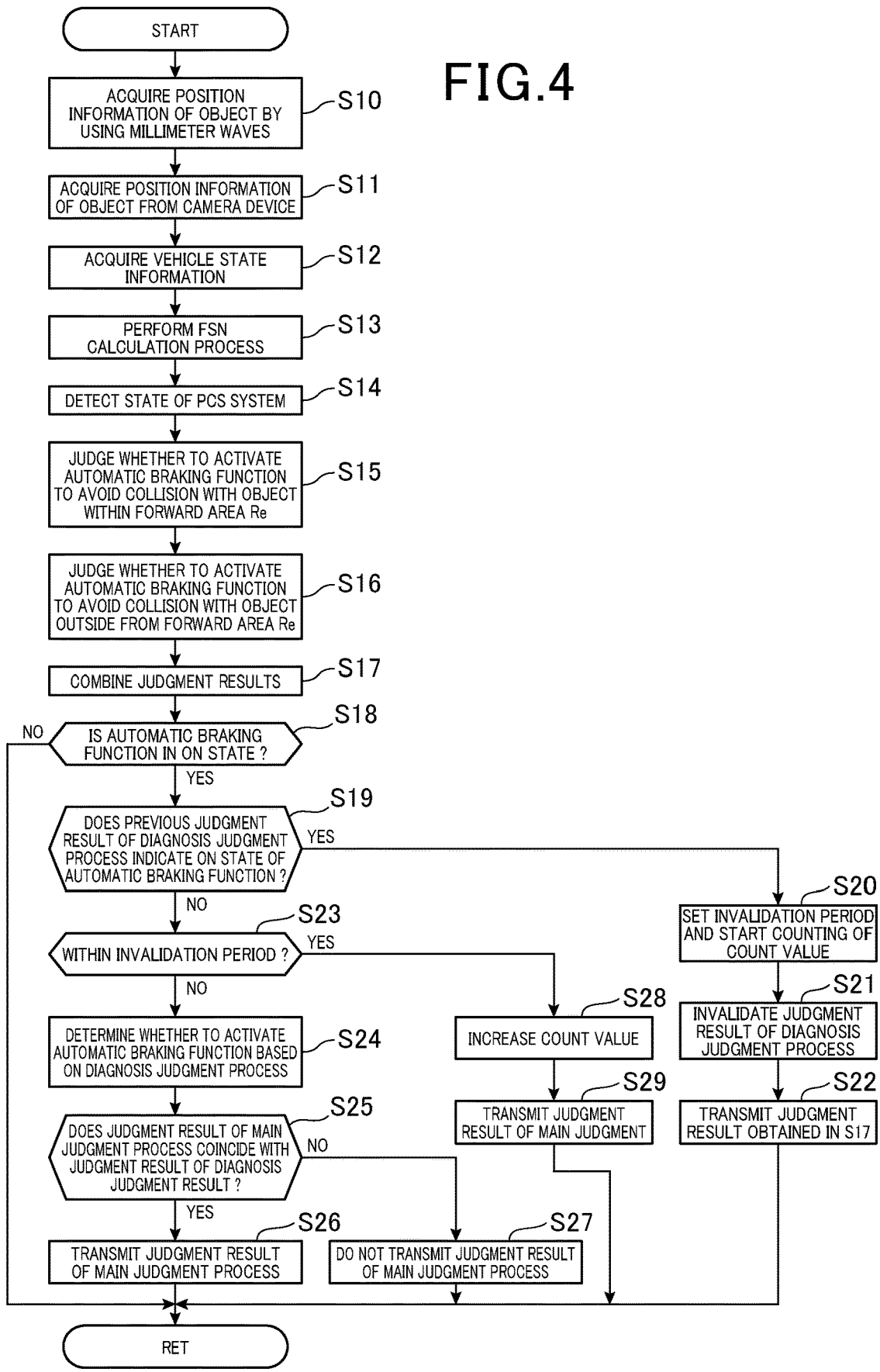
FIG. 4 is a flow chart showing an operation process of operating an automatic braking function according to the first exemplary embodiment.

When the judgment result in step S18 indicates the OFF judgment of the automatic braking function ("NO" in S18), the ECU 20 finishes the process shown in FIG. 4.

On the other hand, when the judgment result in step S18 indicates the ON judgment of the automatic braking function ("YES" in S18), the ECU 20 judges whether the judgment result in the previous diagnosis judgment process indicates the ON judgment of the automatic braking function (S19).

As previously described, the diagnosis judgment process is performed when the judgment result of the main judgment process regarding the automatic braking function indicates the ON judgment. Accordingly, the previous diagnosis judgment process can provide the judgment result of the ON judgment only in the case where both the judgment result of the main judgment process and the judgment result of the diagnosis judgment process indicate that the judgment result of the main judgment result is correct, like the case in the period T4 shown in FIG. 3.

When the judgment result of the previous diagnosis process is the ON judgment ("YES" in step S19), the ECU 20 determines the invalidation period in which the judgment result of the diagnosis judgment process is invalidated, and starts to count up a count value of the invalidation state (S20).

The ECU 20 invalidates the diagnosis judgment process (S21), and transmits the judgment result of the main judgment process calculated in S17 to the control processing part 26 (S22).

On the other hand, when the judgment result of the previous diagnosis process is the OFF judgment ("NO" in step S19), the operation flow progresses to step S23.

The OFF judgment as the judgment result of the previous diagnosis process occurs in:

the case when the judgment result of the previous diagnosis process is in the invalidation state, like the judgment result during the period T5 shown in FIG. 3;

the case when the judgment result of the main judgment process indicates the OFF judgment, like the judgment result during the period T7 shown in FIG. 3; and the case when the judgment result of the main judgment process indicates the incorrect ON judgment, like the judgment result during the period T1 shown in FIG. 3

In S23, the ECU 20 judges whether the current judgment period is within the invalidation period. That is, the ECU 20 judges whether the counting process of the invalidation state has been started, and a count value regarding the invalidation state is less than the invalidation period determined in step S20.

When the judgment result indicates that the counting state is not started or the counting of the invalidation state exceeds the invalidation period ("NO" in step S23), the ECU 20 determines that the current judgment process is out of the invalidation period, the ECU 20 determines whether the automatic braking function is started on the basis of the judgment result of the diagnosis judgment process (S24).

The ECU 20 judges whether the judgment result of the main judgment process calculated in S17 coincides with the judgment result of the diagnosis judgment process for the automatic braking function (S25).

When the judgment result indicates that the judgment result of the main judgment process calculated in S17 coincides with the judgment result of the diagnosis judgment process for the automatic braking function ("YES" in S25), the ECU 20 judges that the judgment result of the main judgment process is correct, and transmits the judgment result of the main judgment process to the control processing part 26. The ECU 20 finishes this process shown in FIG. 4.

On the other hand, when the judgment result indicates that the judgment result of the main judgment process calculated in S17 does not coincide with the judgment result of the diagnosis judgment process for the automatic braking function ("NO" in S25), the ECU 20 determines that the judgment result of the main judgment process is incorrect, and does not transmit the judgment result of the main judgment process to the control processing part 26. The ECU 20 finishes this process shown in FIG. 4.

When the judgment result indicates that the counting of the invalidation state has been started and a count value of the invalidation state is not more than the invalidation period ("YES" in step S23), the ECU 20 increases the count value regarding the invalidation state by one (S28), and transmits the judgment result of the main judgment process to the control processing part 26. The ECU 20 finishes this process shown in FIG. 4.

As previously described, the vehicle control device according to the first exemplary embodiment has the following effects.

(1) The diagnosis judgment process, which is different from the main judgment process, judges whether to activate the automatic braking function, and diagnoses the judgment result of the main judgment process. When the judgment result of the main judgment process is incorrect due to various problems such as memory error, the diagnosis judgment process determines the judgment result of the main judgment process is incorrect, i.e. an abnormal.

When the diagnosis judgment process determines that the judgment result of the main judgment process is correct, the ECU 20 transmits the judgment result of the main judgment process to the control processing part 26. On the other hand, when the diagnosis judgment process determines that the judgment result of the main judgment process is incorrect, the ECU 20 does not transmit the judgment result of the main judgment process to the control processing part 26. As previously described, because the judgment result of the main judgment process is not transmitted to the control processing part 26 when the main judgment process provides an incorrect judgment result, no automatic braking function operates. This control makes it possible to suppress incorrect operation of the automatic braking function.

(2) The diagnosis judgment process judges whether to activate the automatic braking function on the basis of the position information of the object detected by the radar device 13 in addition to the position information of the object detected by the FSN calculation process. Accordingly, there is a low possibility of the diagnosis judgment process generating an incorrect judgment result even if a systematic error such as a memory error is generated in the FSN calculation process. Further, it is possible to appropriately suppress generation of the incorrect operation of the automatic braking function even if the systematic error occurs during the FSN calculation process.

(3) The diagnosis judgment process prevents occurrence of incorrect operation of the automatic braking function due to the systematic failure. Accordingly, it is not necessary for the diagnosis judgment process to detect whether the judgment result to activate no automatic braking function is correct.

It is sufficient for the diagnosis judgment process to judge whether the judgment result of the main judgment process is correct only at the case in which the judgment result of the main judgment process indicates to activate the automatic braking function. Because of avoiding unnecessary calculation process, this control makes it possible to reduce the calculation load of the ECU 20.

(4) The operation of the automatic braking function is required to have high mechanical safety, and on the other hand, the operation of the warning and brake assist function is not required to have such high mechanical safety. Accordingly, incorrect operation of the warning and brake assist function does not cause a serious safety problem. The ECU 20 judges the judgment result of the main judgment process only when the judgment result of the main judgment process indicates to drive the safety device. This makes it possible to suppress and reduce the load of the calculation operation of the ECU 20.

(5) Because an object within the forward area Re is different in moving direction and moving speed in view of the collision risk from another object outside of the forward area Re, the ECU 20 determines whether to activate the automatic braking function by using different judgment processes. This makes it possible to correctly judge the operation of each of the functions of the PCS system.

(6) It is possible to combine the judgment result for an object within the forward area Re with the judgment result of another object outside of the forward area Re in the forward moving direction of the own vehicle, and to diagnose the combined judgment result when compared with the conventional diagnosis process which judges of the judgment result of the object within the forward area Re and the judgment result of the another object outside of the forward area Re, respectively. This makes it possible to reduce the calculation load of the ECU 20 and suppress the consumption of the vehicle control device and other hardware devices.

(7) When the judgment result of the main judgment process is correct once, the ECU 20 avoids the diagnosis judgment process for diagnosing the judgment result of the main judgment process during the predetermined period of time. The predetermined period of time is counted from the time when the ECU 20 determines that the judgment result of the main judgment process is correct. This makes it possible to avoid the diagnosis judgment process from prohibiting the main judgment process after the judgment result of the main judgment process is correct once.

Second Exemplary Embodiment

Figure 5:
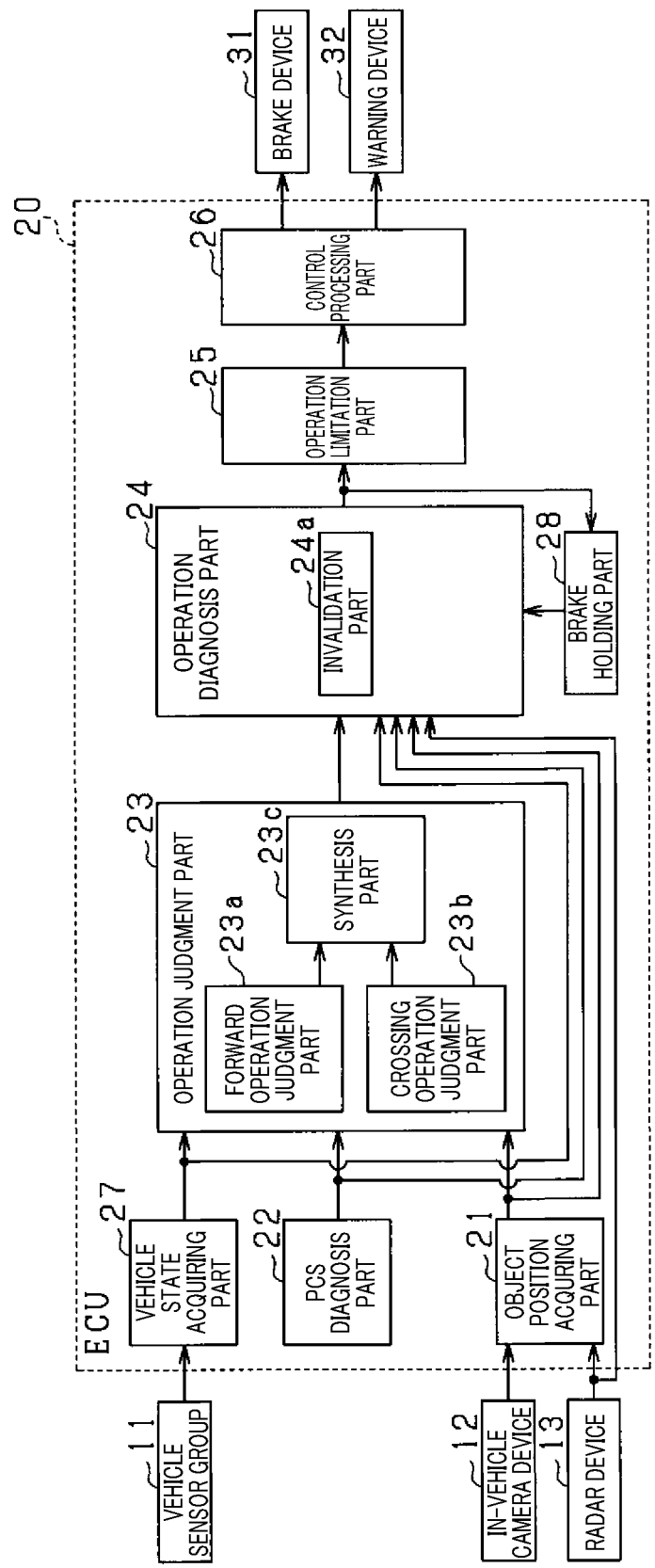
FIG. 5 is a view showing a block diagram of a schematic structure of the vehicle control device according to a second exemplary embodiment.

Next, a description will be given of a difference in vehicle control device between the first exemplary embodiment and the second exemplary embodiment. A structure of the ECU 20 as the vehicle control device according to the second exemplary embodiment will be explained with reference to FIG. 5. The ECU 20 has a brake holding part 28.

For example, when the automatic braking function is released after the own vehicle has stopped due to the collision with the object after performing the automatic braking function, there is a possible case in which the own vehicle moves again in the forward direction of the own vehicle after the driver of the own vehicle has got out the own vehicle. In order to avoid this dangerous accident, the brake holding part 28 maintains the operation of the automatic braking function, i.e. maintains an automatic braking holding state when the automatic braking function stops the movement of the own vehicle.

There is a possible case in which the vehicle sensor group 11, the in-vehicle camera device 12 and the radar device 13 are damaged and malfunction when the automatic braking function is held due to the collision with the object. That is, there is a possible case in which the ECU 20 would provide incorrect detection of the judgment result of the main judgment process when performing the diagnosis judgment process during the period in which the automatic braking function is held.

When the brake holding part 28 holds the automatic braking function, i.e. during the automatic braking holding state, an invalidation part 24a invalidates the judgment result of the diagnosis judgment process performed by the operation diagnosis part 24 so as to maintain the automatic braking holding state.

The operation limitation part 25 transmits the judgment result of the operation judgment part 23 to the control processing part 26 during the automatic braking holding state.

Figure 6:
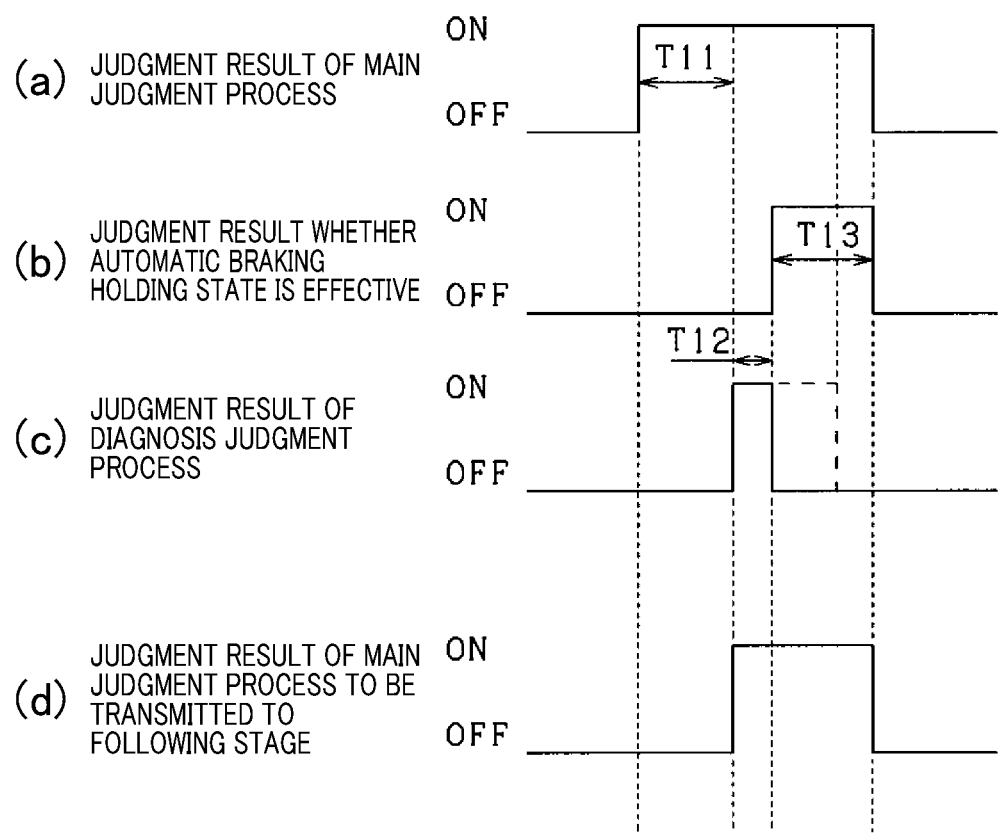
FIG. 6 is a diagram showing a logic levels when the judgment result of the diagnosis judgment process is invalidated in the automatic braking holding state, (a) shows a judgment result of the main judgment process, (b) shows a judgment result whether the automatic braking holding state is effective, (c) shows a judgment result of the diagnosis judgment process, and (d) shows the judgment result to be transmitted to a following stage.

In FIG. 6, (a) to (d) show the judgment results when the automatic braking holding state is effective. In FIG. 6, (c) the dotted line shows the judgment result of the diagnosis judgment process without the automatic braking holding state. In FIG. 6, (d) shows the ON state and the OFF state of the automatic braking holding state.

During the period T11, it is detected that the judgment result of the main judgment process is incorrect due to the systematic failure caused during the main judgment process. During the period T12, it is detected that the judgment result of the main judgment process and the judgment result of the diagnosis judgment process are in the ON state, and the automatic braking function is effective due to the correct judgment result of the main judgment process.

When the own vehicle stops by the automatic braking function, the automatic braking holding state is maintained during the period T13, and the judgment result of the diagnosis judgment process is invalidated. The judgment result of the main judgment process is transmitted to the control processing part 26 during the period T12 and the period T13 in which the judgment result of the main judgment process is effective.

Next, a description will be given of the process of performing the automatic braking function with reference to FIG. 7. The ECU 20 repeatedly performs the automatic braking function in the PCS system for every object. It is acceptable for the control period of the automatic braking function to be the same as, or different from the predetermined period used by the radar device 13 and the in-vehicle camera device 12.

Figure 7:
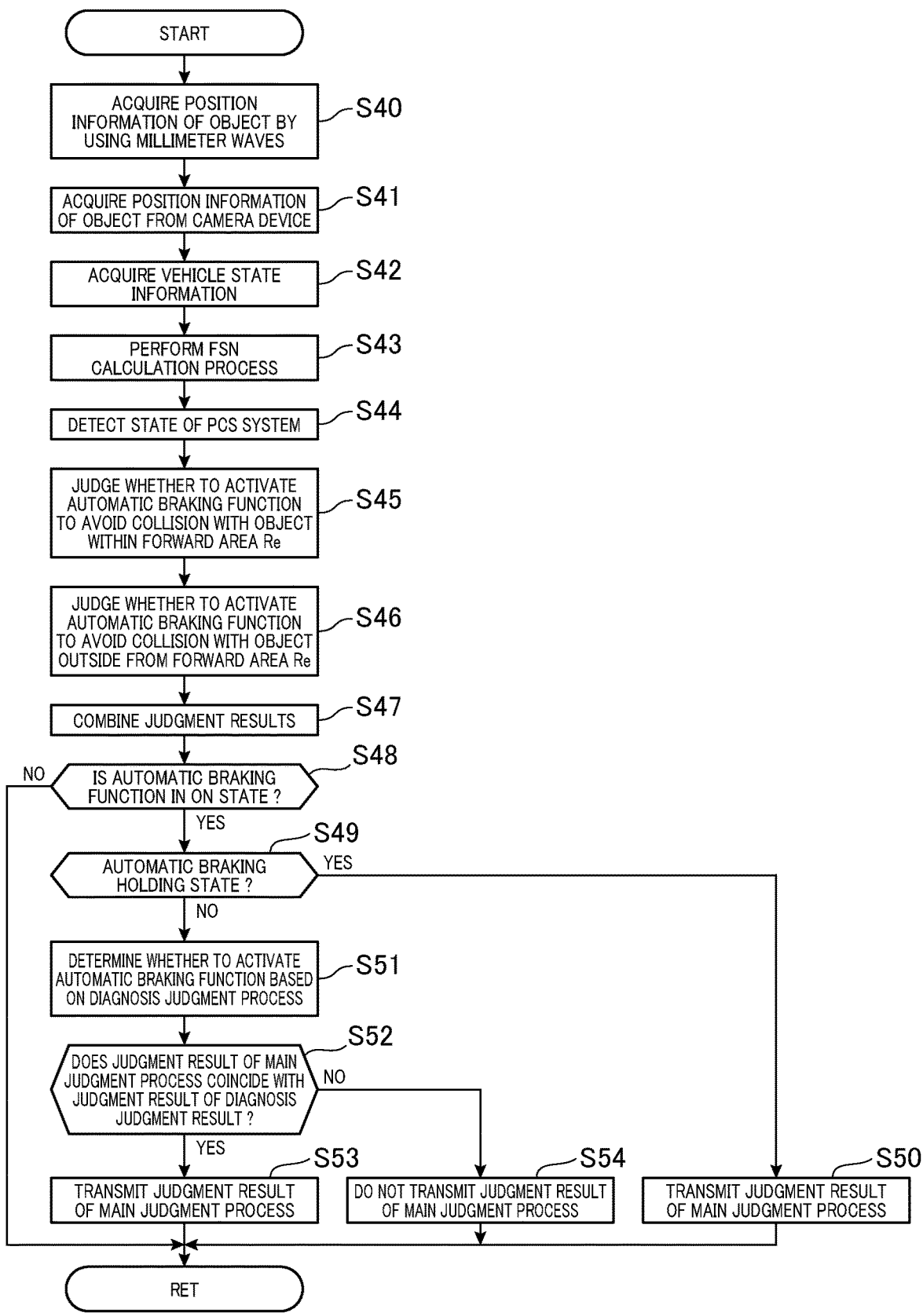
FIG. 7 is a flow chart showing an operation process of operating the automatic braking function according to the second exemplary embodiment.

The processes of S40 to S48 shown in FIG. 7 are the same as the processes of S10 to S18 in the flow chart shown in FIG. 4.

It is detected whether the automatic braking function is kept ON (S49). When the detection result indicates the automatic braking holding state ("YES" in S49), the ECU 20 transmits the judgment result of the main judgment process to the control processing part 26 (S50), and finishes the process shown in FIG. 7.

On the other hand, when the detection result indicates no automatic braking holding state ("NO" in S49), the ECU 20 detects whether the automatic braking holding function is being performed on the basis of the judgment result of the diagnosis judgment process (S51).

The processes of S51 to S54 shown in FIG. 7 are the same as the processes of S24 to S27 shown in FIG. 4. The ECU 20 finishes the process shown in FIG. 7.

The vehicle control device according to the second exemplary embodiment previously described provides the following effect in addition to the effects (1) to (6) of the vehicle control device according to the first exemplary embodiment.

(8) The judgment result of the diagnosis judgment process is invalidated when the automatic braking holding state is maintained. This makes it possible to prevent the automatic braking holding state from being invalidated by the incorrect diagnosis judgment process. Further, it is possible to correctly maintain the stationary state of the own vehicle even if the driver of the own vehicle gets out of the own vehicle and the diagnosis judgment process provides an incorrect judgment result.

Other Modifications

It is preferable for the vehicle control device according to the first exemplary embodiment to have the invalidation part 24a. However, it is acceptable the first exemplary embodiment to provide the vehicle control device without the invalidation part 24a. In this case, the vehicle control device according to the first exemplary embodiment does not use the invalidation period of the diagnosis judgment process. In the flow chart shown in FIG. 4, it is acceptable to eliminate the processes of S28 and S29.

In the second exemplary embodiment, it is preferable for the vehicle control device to have the invalidation part 24a. However, it is acceptable for the second exemplary embodiment to provide the vehicle control device without the invalidation part 24a. That is, it is acceptable to prioritize the automatic braking holding state rather than the diagnosis judgment process when the automatic braking function is held. In this case, it is possible to eliminate the processes of S49 and S50 from the flow chart shown in FIG. 7. In addition, it is acceptable for the vehicle control device without the function of the brake holding part 28.

It is acceptable to perform the diagnosis judgment process at the time when the main judgment process detects whether the brake assist process is performed and the time when the main judgment process detects whether the warning process is performed in addition to the time when the main judgment process detects whether the automatic braking function is performed. In those cases, it is acceptable to perform the processes in the flowchart shown in FIG. 4 and FIG. 7 in order to perform the brake assist process and the warning process. In those cases, at the processes of S18 and S48, it is sufficient to defect whether the brake assist process or the warning process is valid or invalid.

In each of the exemplary embodiments previously described, it is acceptable to perform the diagnosis judgment process in spite of the judgment result of the main judgment process. In this case, the diagnosis judgment process does not use the judgment result of the main judgment process.

In each of the exemplary embodiments previously described, it is acceptable for the operation judgment part 23 to perform each function of the PCS system regardless of the objects which are within the forward area Re or outside from the forward area Re. That is, it is acceptable to perform the processes of S15 to S17 or the processes of S45 to S47.

It is acceptable to use the position information of an object detected by the in-vehicle camera device 12, instead of using the position information of the object detected by the radar device 13, when the vehicle control device of each of the exemplary embodiments performs the diagnosis judgment process. That is, it is acceptable for the operation diagnosis part 24 to judge whether to operate each function of the PCS system on the basis of both the position information of the object obtained by the FSN calculation process and the position information of the object obtained directly by the in-vehicle camera device 12 without performing the FSN calculation process.

In the vehicle control device according to each of the exemplary embodiments, it is acceptable for the operation diagnosis part 24 to have the function of the synthesis part 23c.

In the vehicle control device according to each of the exemplary embodiments, the driver of the own vehicle operates the own vehicle. However, the concept of the present invention can be applied to autonomous vehicles controlled by using a vehicle control ECU, etc. In this case, it is sufficient for the PCS system to have the automatic braking function only.

It is also acceptable for the vehicle control device according to each of the exemplary embodiments to have the brake device 31 only, without the warning device 32.

For example, it is acceptable to perform each of the functions of the ECU 20 by using a portable information device carried by the driver of the own vehicle, instead of using the ECU 20 as a computer system mounted on the own vehicle. It is also acceptable to use different processing devices having the functions of the operation judgment part 23 and the operation diagnosis part 24, respectively.

REFERENCE SIGNS LIST

12 In-vehicle camera device,
13 Radar device, and
20 ECU.

The invention claimed is:

1. A vehicle control method to be executed by a processing device, the processing device configured to operate a safety device mounted on an own vehicle, the safety device configured to reduce a collision risk with an object or collision damage of the own vehicle based on the collision risk of the own vehicle with the object, the object being present in front of the own vehicle in a forward direction of the own vehicle, the own vehicle being equipped with a radar device and an in-vehicle camera device, the vehicle control method comprising:

acquiring a position of the object on the basis of a combination of position information of the object detected by the radar device and position information of the object detected by the in-vehicle camera device;

judging whether to drive the safety device by using a first calculation process on the basis of the acquired position of the object;

determining whether to drive the safety device by using a second calculation process, which is different from the first calculation process, on the basis of the acquired position of the object;

diagnosing whether a judgement result to drive the safety device is correct; and transmitting the judgment result to a control processing part to drive the safety device or prohibiting the transmission of the judgment result based on the diagnosis result.

2. A vehicle control device mounted on an own vehicle equipped with a radar device and an in-vehicle camera device, the vehicle control device driving a safety device so as to reduce a collision risk with an object or collision damage of the own vehicle based on a level of the collision risk of the own vehicle with the object and a predetermined level of collision risk, the object being present in front of the own vehicle, the vehicle control device comprising a computer system including a central processing unit, the central processing unit configured to perform the steps of:

acquiring a position of the object, by an object position acquiring part, on the basis of a combination of position information of the object detected by the radar device and position information of the object detected by the in-vehicle camera device;

performing a first judgment, by an operation judgment part, which judges whether to drive the safety device by using a first calculation process on the basis of the position of the object acquired by the object position acquiring part;

performing a second judgment, by an operation diagnosis part, which judges whether to drive the safety device by using a second calculation process, which is different from the first calculation process performed by the operation judgment part, on the basis of the position of the object acquired by the object position acquiring part;

performing a diagnosis, by the operation diagnosis part, to determine whether a judgment result of the operation judgment part is correct;

driving the safety device, by a control processing part; and transmitting a judgment result of the operation judgment part, by an operation limitation part, to the control processing part or prohibiting the transmission of the judgment result of the operation judgment part based on the diagnosis result.

3. A vehicle control device mounted on an own vehicle equipped with a radar device and an in-vehicle camera device, the vehicle control device driving a safety device configured to reduce a collision risk with an object or collision damage of the own vehicle based on a level of the collision risk of the own vehicle with the object and a predetermined level of collision risk, the object being present in front of the own vehicle, the vehicle control device comprising a computer system including a central processing unit, the central processing unit comprising:
- an object position acquiring part configured to acquire a position of the object on the basis of a combination of position information of the object detected by the radar device and position information of the object detected by the in-vehicle camera device;
- an operation judgment part configured to perform a first judgment to judge whether to drive the safety device by using a first calculation process on the basis of the position of the object acquired by the object position acquiring part;
- an operation diagnosis part configured to perform a second judgment to judge whether to drive the safety device by using a second calculation process, which is different from the first calculation process performed by the operation judgment part, on the basis of the position of the object acquired by the object position acquiring part, and the operation diagnosis part is further configured to diagnose whether a judgment result of the operation judgment part is correct;
- a control processing part configured to drive the safety device; and
- an operation limitation part configured to transmit the judgment result of the operation judgment part to the control processing part or prohibit the transmission of the judgment result of the operation judgment based on the diagnosis result.

4. A vehicle control device mounted on an own vehicle equipped with a radar device and an in-vehicle camera device, the vehicle control device driving a safety device configured to reduce a collision risk with an object or collision damage of the own vehicle based on a level of the collision risk of the own vehicle with the object and a predetermined level of collision risk, the object being present in front of the own vehicle, the vehicle control device comprising a computer system including a central processing unit, the central processing unit comprising:
- an object position acquiring part configured to acquire a position of the object on the bask of a combination of position information of the object detected by the radar device and position information of the object detected by the in-vehicle camera device;
- an operation judgment part configured to judge whether to drive the safety device by using a first calculation process on the bask of the position of the object acquired by the object position acquiring part;
- an operation diagnosis part configured to determine whether to drive the safety device by using a second calculation process, which is different from the first calculation process performed by the operation judgment part, on the bask of the position of the object acquired by the object position acquiring part, and the operation diagnosis part further configured to diagnose whether a judgment result of the operation judgment part is correct;
- a control processing part configured to drive the safety device; and
- an operation limitation part configured to transmit the judgment result of the operation judgment part to the control processing part or prohibit the transmission of the judgment result of the operation judgment part-based on the diagnosis result; and
- wherein the operation diagnosis part is configured to determine whether to drive the safety device on the basis of the position of the object acquired by the object position acquiring part, and the position information of the object detected by the radar device or the position information of the object detected by the in-vehicle camera device before the object position acquiring part combines the position information of the object detected by the radar device with the position information of the object detected by the in-vehicle camera device.

5. The vehicle control device according to claim 3, wherein the operation diagnosis part is configured to diagnose the judgment result of the operation judgment part based on the judgment result of the operation judgment part indicating to drive the safety device.

6. The vehicle control device according to claim 3, wherein the vehicle control device is configured to perform a first operation and a second operation to drive the safety device, the collision risk for the second operation being higher than the collision risk for the first operation,
- wherein the second operation is configured to automatically drive a brake device as the safety device of the own vehicle regardless of a driver's amount of operation of the brake device of the own vehicle, and the operation diagnosis part is configured to diagnose the judgment result of the operation judgment part based on the judgment result of the operation judgment part indicating to automatically drive the brake device.

7. A vehicle control device mounted on an own vehicle equipped with a radar device and an in-vehicle camera device, the vehicle control device driving a safety device configured to reduce a collision risk with an object or collision damage of the own vehicle based on a level of the collision risk of the own vehicle with the object and a predetermined level of collision risk, the object being present in front of the own vehicle, the vehicle control device comprising a computer system including a central processing unit, the central processing unit comprising:
- an object position acquiring part configured to acquire a position of the object on the basis of a combination of position information of the object detected by the radar device and position information of the object detected by the in-vehicle camera device;
- an operation judgment part configured to judge whether to drive the safety device on the basis of the position of the object acquired by the object position acquiring part;
- an operation diagnosis part configured to determine whether to drive the safety device by using a calculation process which is different from a calculation process performed by the operation judgment part on the basis of the position of the object acquired by the object position acquiring part, and the operation diagnosis part is further configured to diagnose whether a judgment result of the operation judgment part is correct
- a control processing part configured to drive the safety device; and
- an operation limitation part configured to transmit the judgment result of the operation judgment part to the control processing part or prohibit the transmission of the judgment result of the operation judgment part-based on the diagnosis result; and
- wherein the vehicle control device is configured to perform a first operation and a second operation to drive the safety device, the collision risk for the second operation being higher than the collision risk for the first operation, the second operation is configured to drive a brake device as the safety device of the own vehicle regardless of a driver's amount of operation of the brake device of the own vehicle, and the operation diagnosis part is configured to diagnose the judgment result of the operation judgment part based on the judgment result of the operation judgment part indicating to automatically drive the brake device.

8. The vehicle control device according to claim 3, wherein the operation judgment part comprising:

a front operation judgment part configured to judge whether to drive the safety device on the basis of the position of an object which is present within a forward area, in a forward direction of the own vehicle, which is the same as a left-right width of the own vehicle; and a crossing operation judgment part configured to judge whether to drive the safety device on the basis of the position of an object which is present outside from the area extended in the forward direction from the own vehicle by the forward distance, wherein the operation diagnosis part, is configured to diagnose, as the judgment result of the operation judgment part, a judgment result obtained by a combination of the judgment result of the front operation judgment part and the judgment result of the crossing operation judgment part.

9. The vehicle control device according to claim 3, further comprising an invalidation part configured to invalidate the diagnosis result of the operation diagnosis part during a predetermined period of time based on the operation diagnosis part diagnosing that the judgment result of the operation judgment part is correct, wherein the operation limitation part is configured to transmit the judgment result of the operation judgment part to the control processing part during the predetermined period of time during which the invalidation part is configured to invalidate the diagnosis result of the operation diagnosis part.

10. The vehicle control device according to claim 3, wherein the safety device comprises a brake device of the own vehicle, and the vehicle control device further comprises:

a brake holding part configured to maintain an operation state of the brake device; and an invalidation part configured to invalidate the diagnosis result of the operation diagnosis part.

\* \* \* \* \*